United States Patent [19]
Yang et al.

[11] Patent Number: 6,090,188
[45] Date of Patent: Jul. 18, 2000

[54] AIR INTAKE APPARATUS OF CHEMICAL VAPOR DEPOSITION EQUIPMENT AND METHOD FOR REMOVING OZONE USING THE SAME

[75] Inventors: Chang-jip Yang; Geun-mok Youk; Chong-hyeong Cho, all of Kyungki-do; Young-kyou Park, Seoul, all of Rep. of Korea

[73] Assignee: Samsung Electronics Co., Ltd., Suwon, Rep. of Korea

[21] Appl. No.: 09/161,980

[22] Filed: Sep. 29, 1998

[30] Foreign Application Priority Data

Sep. 30, 1997 [KR] Rep. of Korea ............. 97-50374

[51] Int. Cl.[7] ............. B01D 29/56; B01D 39/16
[52] U.S. Cl. ............. 95/285; 55/471; 55/473; 55/486; 55/385.2; 95/287
[58] Field of Search ............. 55/385.2, 467, 55/471, 470, 473, 486, 487, 522; 96/223, 226, 222; 454/187; 95/287, 285

[56] References Cited

U.S. PATENT DOCUMENTS

| | | | |
|---|---|---|---|
| 3,577,710 | 5/1971 | Feldman | 55/467 |
| 5,039,321 | 8/1991 | Satoh et al. | 55/385.2 |
| 5,626,820 | 5/1997 | Kinkead et al. | |
| 5,681,364 | 10/1997 | Fortune | 55/400 |
| 5,752,985 | 5/1998 | Nagafune et al. | |
| 5,772,738 | 6/1998 | Muraoka | 55/385.2 |
| 5,827,339 | 10/1998 | Nagafune et al. | 55/385.2 |

FOREIGN PATENT DOCUMENTS

| | | |
|---|---|---|
| 0 748 990 A1 | 12/1996 | European Pat. Off. . |
| 197 21 515 A1 | 4/1998 | Germany . |
| 2-126912 | 5/1990 | Japan ............. 55/385.2 |

*Primary Examiner*—David A. Simmons
*Assistant Examiner*—Robert A. Hopkins
*Attorney, Agent, or Firm*—Jones Volentine, LLP

[57] ABSTRACT

An air intake apparatus for semiconductor fabricating equipment reduces the inflow of chemical contaminants, such as ozone ($O_3$), into the equipment. The air intake apparatus includes a fan as an air intake device, and a chemical filter containing activated carbon to remove the chemical contaminants from air drawn in from outside the equipment. The air intake apparatus may further include first and second filters for removing particulate contaminants from the air. By applying the air intake apparatus to chemical vapor deposition (CVD) equipment used to carry out a process for forming hemispherical grains (HSGs), which is sensitive to a native oxide layer, the ozone density inside the CVD equipment is decreased. Accordingly, the semiconductor device produced has a higher capacitance and enhanced performance.

9 Claims, 6 Drawing Sheets

AIR INTAKE APPARATUS OF CHEMICAL VAPOR DEPOSITION EQUIPMENT AND METHOD FOR REMOVING OZONE USING THE SAME

BACKGROUND OF THE INVENTION

1. Field of the Invention

The present invention relates to equipment for semiconductor fabrication, and more particularly, to an air intake apparatus installed in chemical vapor deposition (CVD) equipment and method for removing ozone using the same.

2. Description of the Related Art

Fine particles or chemicals may contaminate a highly integrated semiconductor device during fabrication, thereby lowering the quality of the final product. In particular, when manufacturing a very large-scale integrated semiconductor device such as a 1 GB DRAM having a 0.18 µm line width, fine particles or chemicals may unexpectedly disrupt the fabrication process. Thus, careful attention is required to suppress particulate contaminants, and conventional semiconductor fabricating equipment must be carefully examined if high quality very large-scale integrated semiconductor devices are to be produced successfully. Semiconductor fabricating equipment which execute processes that vary in response to environmental factors, such as air purity, must be especially considered.

Such semiconductor fabricating equipment generally uses various types of filters in order to filter out potential contaminants. However, most filters can remove only solid particles, i.e., particulate contaminants, and not chemical contaminants. As a result, ozone ($O_3$), oxygen-nitrogen compounds ($NO_x$), and oxygen-sulfur compounds ($SO_x$) flow into semiconductor fabricating equipment via the filter, without being eliminated by the filter. The $O_3$, $NO_x$ and $SO_x$ cause chemical reactions to occur in the wafer being processed. These chemical reactions lower the quality of the resultant semiconductor device.

Moreover, many types of semiconductor fabricating equipment are sensitive to chemical contaminants. In particular, such chemical contamination is especially serious in chemical vapor deposition (CVD) equipment used to carry out a hemispherical polysilicon grain process.

FIGS. 1 and 2 show conventional air intake apparatus of semiconductor fabricating equipment.

FIG. 1 shows an air intake apparatus which is mainly used when the air intake path is relatively short, and FIG. 2 shows an air intake apparatus which is mainly used when the air intake path is relatively long. The air intake apparatus includes a fan 10 for drawing air from the outside into the equipment, and a high efficiency particle air (HEPA) filter 12 for removing particulate contaminants entrained in the air. That is, after air is drawn in from the outside via the fan 10, the particulate contaminants in the air are eliminated using the HEPA filter 12. Reference numeral 14 in FIG. 1 designates a pre-filter for eliminating large particulate contaminants upstream of the fan 10.

However, since the above-described air intake apparatus for semiconductor fabricating equipment cannot remove chemical contaminants existing in the air, such as $O_3$, $NO_x$ and $SO_x$, the chemicals flow to the equipment, thereby adversely affecting the quality of the semiconductor device being manufactured. This problem is, again, particularly serious in CVD equipment used to form hemispherical polysilicon grains (HSGs).

SUMMARY OF THE INVENTION

An object of the present invention is to provide an air intake apparatus for use in semiconductor fabricating equipment, having a chemical filter for removing chemical contaminants from the air flowing to the equipment, thereby improving the quality of semiconductor devices produced by the semiconductor fabricating equipment.

It is another object of the present invention to provide a method for eliminating chemical contaminants with the air intake apparatus.

To achieve the first object, the present invention provides an air intake apparatus for use in semiconductor fabricating equipment, including an air intake device for drawing in air from the outside, and a chemical filter for removing chemical contaminants from the air that has passed through the air intake device.

The air intake apparatus may further include a filter for removing particulate contaminants from the air passing through the chemical filter. This filter may be disposed downstream or upstream of the chemical filter.

Preferably, the air intake apparatus includes a first filter upstream of the air intake device, and a fan for offsetting a loss in air pressure, disposed between the chemical filter and a second filter. The air intake device may also be a fan, and the first filter may have larger air intake holes than the second filter.

Preferably, the chemical filter contains activated carbon in order to remove ozone ($O_3$) from the air, and has a structure in which air intake holes are formed in a body containing the activated carbon.

To achieve the second object, the present invention provides a method of removing chemical contaminants, including: (a) drawing in air from outside the semiconductor fabricating equipment using an air intake device; and (b) filtering chemical contaminants from the drawn in air using a chemical filter of the semiconductor fabricating equipment.

Preferably, the method of removing chemical contaminants further includes a step of removing particulate contaminants of the air from which the chemical contaminants have been filtered, using another filter of the semiconductor fabricating equipment. The step of removing particulate contaminants from the air may be performed after the step (a) of drawing in air using the air intake device, and before the step (b) of filtering chemical contaminants using the chemical filter.

Preferably, the method of removing chemical contaminants includes a step of removing particulate contaminants from the air using a first filter, before the step of drawing in air using the air intake device, and a step of offsetting a loss in air pressure using an extra fan disposed between a second filter and a chemical filter.

Preferably, the first filter has larger air intake holes than the second filter, the air intake device is a fan, and a step of filtering chemical contaminants using the chemical filter employs a chemical reaction where activated carbon on the surface of the chemical filter absorbs ozone from the air.

According to the present invention, the chemical contaminants flowing to semiconductor fabricating equipment are removed, thereby improving the performance of a semiconductor device produced by the semiconductor fabricating equipment.

BRIEF DESCRIPTION OF THE DRAWINGS

The above objects and other advantages of the present invention will be described with reference to the attached drawings, of which.

DETAILED DESCRIPTION OF THE PREFERRED EMBODIMENTS

The present invention will now be described more fully hereafter with reference to the accompanying drawings. In the following description, the term "chemical filter" encompasses a broad range of configurations, and is not limited to a particular shape or structure. For example, a disclosed embodiment illustrates a rectangular-shaped chemical filter having air intake holes and containing activated carbon, however, it is understood that the body of the chemical filter may be circular, elliptical, polygonal or some other suitable shape. Also, the air intake holes of the chemical filter are disclosed as undulations having rounded crests and troughs, although the air intake holes may comprise many different and suitable configurations. Also, using a pre-filter as a first filter and a high efficiency particle air (HEPA) filter as a second filter is not for limiting the filter type, but should be construed as indicating that larger particles are removed first and smaller particles are then removed by the second filter. Thus, an ultra particle air (ULPA) filter capable of removing much smaller particles may be used as a second filter, instead of the HEPA filter, within the spirit and scope of the present invention. Thus, the following embodiments are exemplary and the present invention should not be construed as being limited thereto.

EXAMPLE 1

Figure 1:
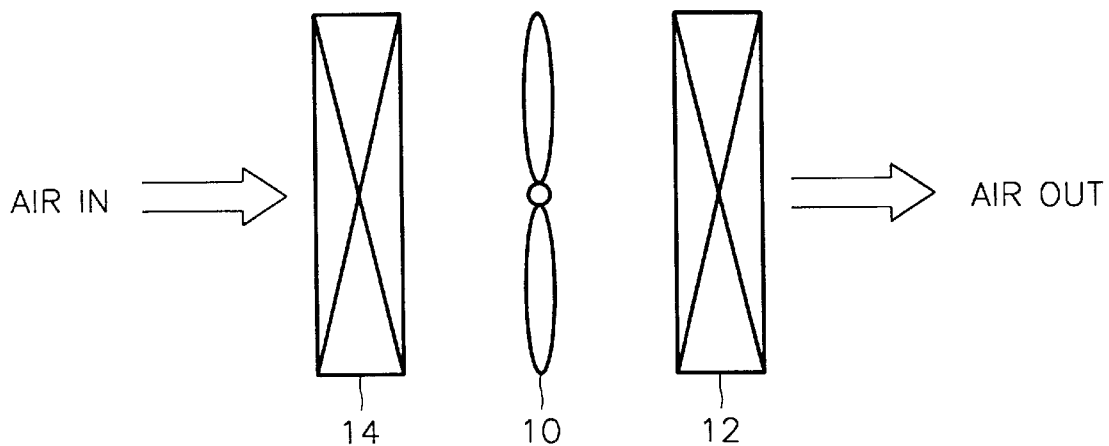
FIG. 1 is a schematic diagram of a conventional air intake apparatus of semiconductor fabricating equipment.
Figure 2:
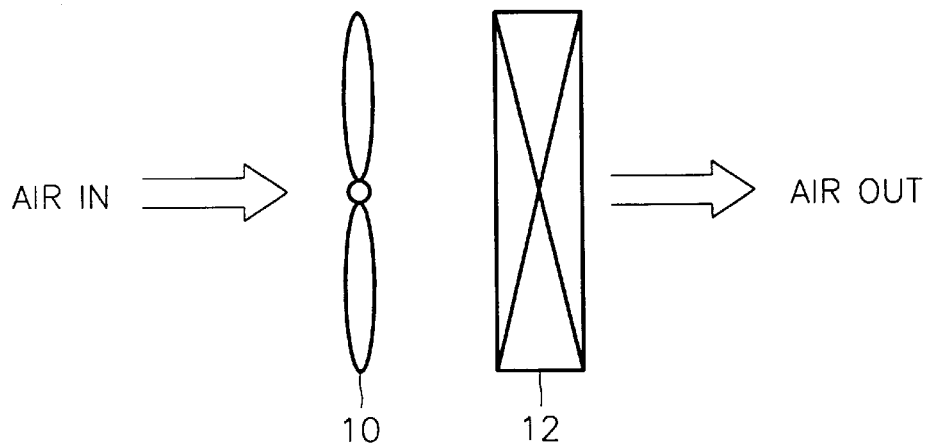
FIG. 2 is a schematic diagram of another conventional air intake apparatus of semiconductor fabricating equipment.
Figure 3:
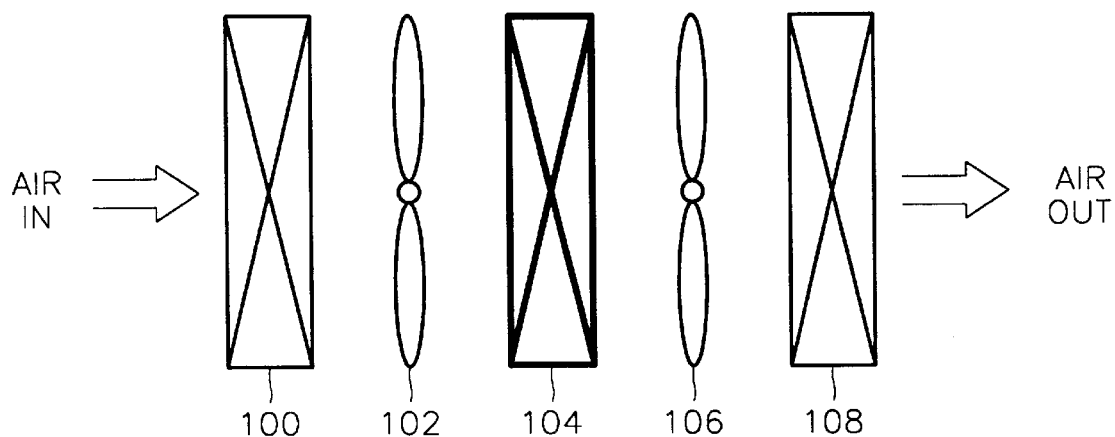
FIG. 3 is a schematic diagram of a first embodiment of an air intake apparatus of semiconductor manufacturing equipment according to the present invention.

FIG. 3 shows an embodiment of an air intake apparatus according to the present invention, which is particularly suitable for semiconductor fabricating equipment when the air intake path is long. First, relatively large particulate contaminants are eliminated from the air flowing to the air intake apparatus for semiconductor fabricating equipment (not shown) by a first filter 100, e.g., a pre-filter. Then, the air flows to the air intake apparatus for filtering air via an air intake means 102 in the form of a first fan, and then chemical contaminants remaining in the air, such as ozone ($O_3$), are eliminated from the air by a chemical filter 104. If the air intake path is long, the pressure of the air induced into the system by the first fan as the air intake means 102 will decrease while passing through the chemical filter 104. Thus, a second fan 106 is provided to maintain the air pressure so that the air passing through the chemical filter 104 will flow to a second filter 108, e.g., a high efficiency particle air (HEPA) filter, which removes particulate contaminants. The second filter 108 removes any remaining particulate contaminants from the air.

Thus, the air intake apparatus for semiconductor fabricating equipment eliminates chemical contaminants as well as the particulate contaminants from the air drawn in from the outside, thereby improving the performance of semiconductor devices produced by the semiconductor equipment.

While both the first filter 100 and second filter 108 remove particles from the air, the air intake holes of the first filter 100, e.g., a pre-filter, are larger than those of the second filter 108, e.g., a HEPA filter. Thus, the particles removed by the first filter 100 are larger than the particles removed by the second filter 108.

Figure 4:
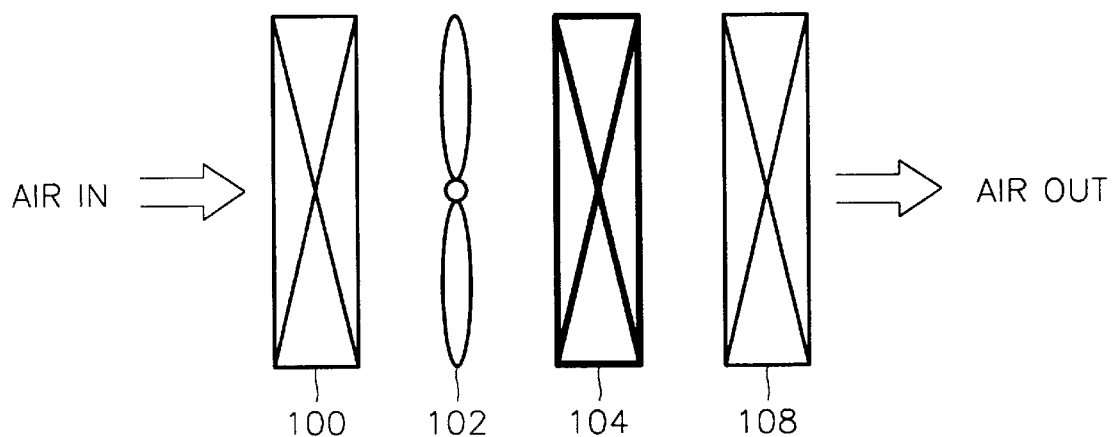
FIG. 4 is a schematic diagram of a second embodiment of an air intake apparatus of semiconductor manufacturing equipment according to the present invention.

FIG. 4 shows an embodiment of an air intake apparatus according to the present invention, which is particularly suitable for semiconductor fabricating equipment when the air intake path is short. As compared to the embodiment of FIG. 3, note that there is no second fan between the chemical filter 104 and the HEPA filter 108. This apparatus is practical when there is little loss of air pressure after the air passes through the chemical filter 104, i.e., when there is a short air intake path.

Figure 5:
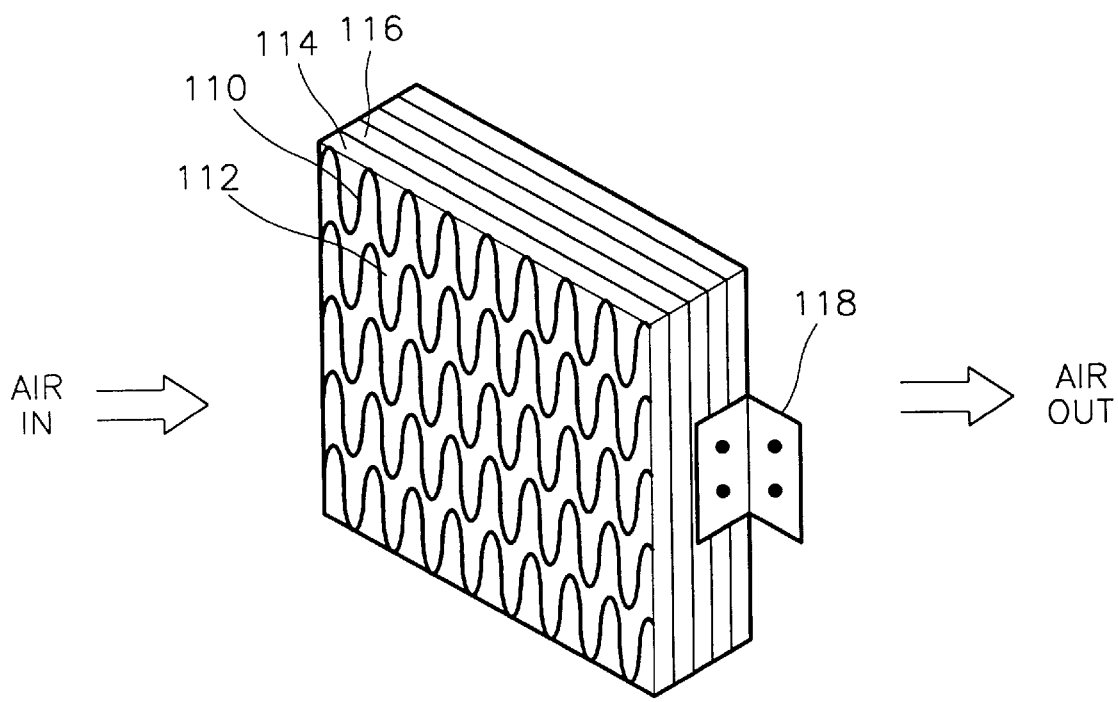
FIG. 5 is a perspective view of a chemical filter used in the embodiments of FIGS. 3 and 4.

FIG. 5 shows, in more detail, the chemical filter used in the embodiments of FIGS. 3 and 4. The chemical filter can be made by chemically processing the surface of a general use filter so that the surface will react with chemical contaminants in the air and absorb such contaminants in the process of the reaction. For instance, the chemical filter of the present invention is for removing ozone ($O_3$) from the air. To this end, the surface of the body 110 of the filter has been treated so as to comprise activated carbon.

Furthermore, an outermost layer 114 of the body 110 of the chemical filter has air intake holes 112 arrayed in rounded undulations so that the activated carbon component is spread as widely as possible over the effective area of the filter. Thus, chemical contaminants, such as ozone ($O_3$), oxygen-nitrogen compounds ($NO_x$), and oxygen-sulfur compounds ($SO_x$), passing through the air intake holes 112, are absorbed by the activated carbon, whereby carbon dioxide ($CO_2$) is produced as the reaction product. That is, ozone passing through the chemical filter is removed because the ozone and the activated carbon of the filter react to produce carbon dioxide ($CO_2$).

Preferably, the body 110 of the chemical filter comprises a plurality of layers. In a second layer 116, i.e., in the layer next to the outermost layer 114, the undulating air intake holes are oriented at 90 degrees relative to those of the outermost layer 114. Thus, the ozone in air passing through the chemical filter has a greater chance to react with the activated carbon, whereby the chemical filter effectively removes more ozone from the air. The additional layers shown in the figure are of the same structure as layers 114 and 116 but also have their undulating air intake holes oriented at 90 degrees relative to the air intake holes of the adjacent layers of the filter. Finally, reference numeral 118 designates a chemical filter mounting portion used to install the chemical filter in semiconductor fabricating equipment.

Now, a method for removing chemical contaminants, using the air intake apparatus of the semiconductor fabricating equipment, will be described with reference to FIGS. 3 through 5.

First, the air intake means 102 (the first fan) is operated to draw in air from the outside. The first filter 100, e.g., a pre-filter, is disposed upstream of the air intake means 102 to remove comparatively large particulate contaminants from the air. Then, the air passes through the air intake holes 112 (see FIG. 5) of the chemical filter 104. There, oxygen contained in the chemical components of the air, such as ozone ($O_3$), oxygen-nitrogen compounds ($NO_x$) and oxygen-sulfur compounds ($SO_x$), passing through the air intake holes 112, reacts with the activated carbon of the chemical filter body 110, producing carbon dioxide ($CO_2$). As a result, the ozone is in effect removed from the air. If the air intake path is long, the air loses pressure while passing through the chemical filter 104. However, such a loss in air pressure is compensated for by the second fan 106 interposed between the chemical filter 104 and the second filter 108. If the air intake path is short, and the loss in air pressure is negligible, then the second fan 106 is unnecessary. Finally, fine particulate contaminants flowing to the second filter 108 by the operation of the second fan 106 are removed by the second filter 108. The air intake holes of the HEPA filter, as the second filter 108, are smaller than those of the first filter 100, thereby removing the fine particulate contaminants.

EXAMPLE 2

In the above embodiments of the present invention, the chemical filter is disposed directly downstream of the air intake means, i.e., the first fan. In the following embodiments, the second (HEPA) filter is disposed directly downstream of the first fan, and the chemical filter is disposed downstream of the HEPA filter.

Figure 6:
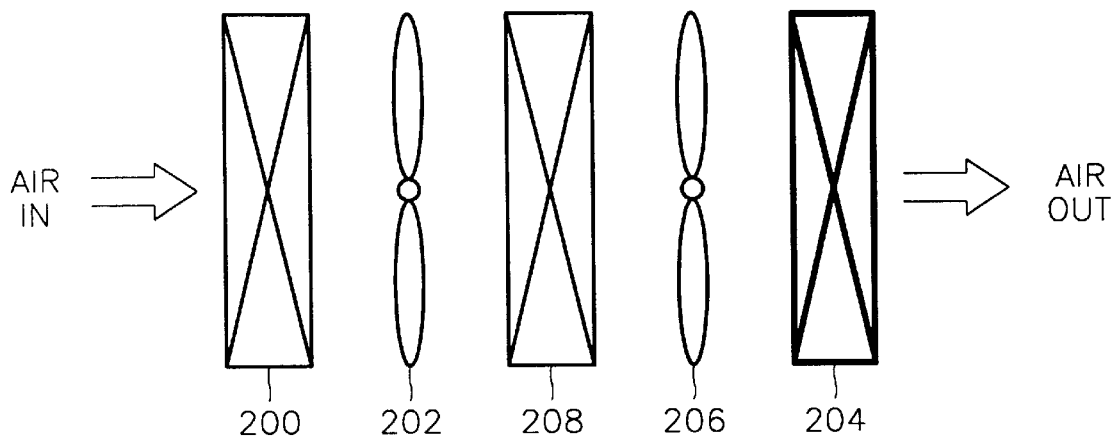
FIG. 6 is a schematic diagram of a third embodiment of an air intake apparatus of semiconductor manufacturing equipment according to the present invention.

FIG. 6 shows a third embodiment of an air intake apparatus according to the present invention, which is particularly suitable for semiconductor fabricating equipment when the air intake path is long. The air intake apparatus includes a first filter 200 located at the upstream end of the air intake path, an air intake means 202 in the form of a first fan, a second filter 208 in the form of a HEPA filter disposed directly downstream of the air intake means 202, a second fan 206 for boosting the air pressure, and a chemical filter 204 installed at the downstream end of the air intake path. The structure and function of each unit constituting the air intake apparatus are the same as those of the first embodiment, and thus an explanation thereof will be omitted.

Figure 7:
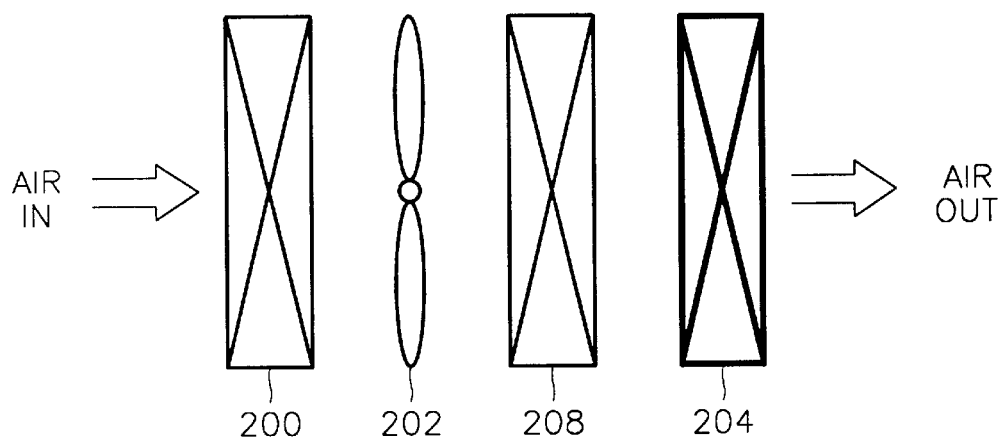
FIG. 7 is a schematic diagram of a fourth embodiment of an air intake apparatus of semiconductor manufacturing equipment according to the present invention.

FIG. 7 shows a fourth embodiment of an air intake apparatus according to the present invention, which is particularly suitable for semiconductor fabricating equipment when the air intake path is short. The structure of the air intake apparatus shown in FIG. 7 is different from that of FIG. 6 only in that there is no second fan because the drop in pressure of the air passing through the second filter 208 is negligible due to the short air intake path.

Now, a method of removing chemical contaminants using the air intake apparatus of semiconductor fabricating equipment will be described with reference to FIGS. 6 and 7.

First, air is drawn in from the outside of the semiconductor fabricating equipment by the operation of the first fan as the air intake means 202 of FIG. 6. The first filter 200, e.g. a pre-filter, disposed upstream of the air intake means 202 removes comparatively large particulate contaminants from the air. Then, fine particulate contaminants are removed from the air by the HEPA filter as the second filter 208. If the air intake path is long, the air would lose pressure while passing through the second filter 208, and such a potential loss in pressure is compensated for by the second fan 206 interposed between the second filter 208 and the chemical filter 204. On the other hand, if the air intake path is short, the drop in air pressure is negligible and hence the second fan 206 is unnecessary. Finally, oxygen components of the chemical contaminants, such as ozone ($O_3$), oxygen-nitrogen compounds ($NO_x$) and oxygen-sulfur compounds ($SO_x$), react with the activated carbon contained in the body of the chemical filter while passing through the air intake holes of the chemical filter, thereby producing carbon dioxide ($CO_2$) in the chemical filter 204. As a result, the ozone is effectively removed from the air.

EXPERIMENTAL EXAMPLE

The HSG process increases capacitance by increasing the surface area of a capacitor storage electrode of a DRAM, and is adopted when a very large scale DRAM is fabricated. The increase in surface area is achieved by forming HSGs on the surface of the storage electrode. The mechanism of forming the HSGs is as follows. First, small amorphous silicon seeds are formed on polysilicon constituting the storage electrode of a capacitor. Then, under a vacuum and at an appropriate temperature, polysilicon atoms of the storage electrode migrate to a location near the small amorphous silicon seeds, thereby growing the small amorphous silicon seeds into grains on the surface of the storage electrode of the capacitor.

However, if chemical contaminants such as ozone are allowed to pass through the air intake apparatus of the CVD equipment, a native oxide ($SiO_2$) layer is formed on the surface of the polysilicon of the storage electrode during the HSG growing process. The native oxide layer prevents the migration of the polysilicon atoms to locations near the small amorphous silicon seeds, thereby inhibiting the growth of the HSGs. This in turn results in the fabrication of a DRAM of lower capacitance, i.e., of lower performance.

Figure 8:
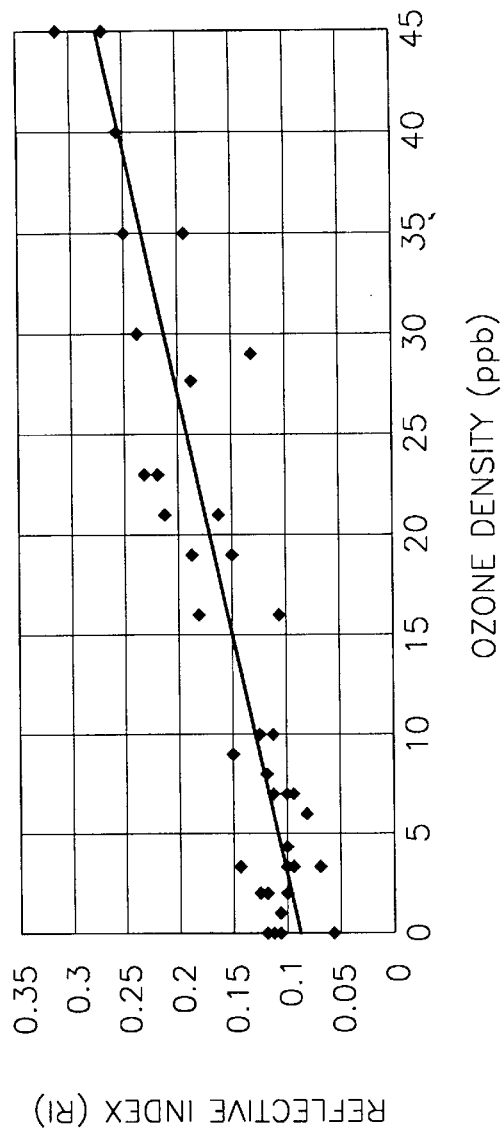
FIG. 8 is a graph showing the correlation between the density of ozone and the reflective index at the surface of a wafer having undergone a hemispherical polysilicon grain (HSG) process in chemical vapor deposition (CVD) equipment.

FIG. 8 is a graph showing reflective index measured at the surface of the polysilicon of the storage electrode during the HSG growing process, versus ozone density within the CVD equipment. Generally, when ozone flows into semiconductor fabricating equipment, a native oxide layer is formed, thereby increasing the reflective index. In FIG. 8, the ozone density (ppb) is plotted along the X-axis whereas the reflective index is plotted along the Y-axis. As can be seen from the graph, the ozone density and the reflective index have a direct proportional relationship. That is, as the ozone density increases, the reflective index increases due to the effect of the natural oxide layer formed by the ozone.

Figure 9:
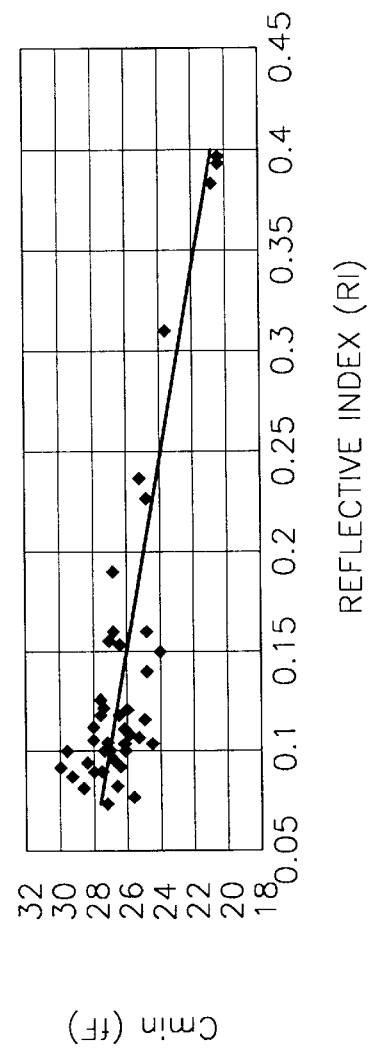
FIG. 9 is a graph showing the correlation between the reflective index and the minimum capacitance that a storage electrode of a semiconductor device is capable of producing after the device is produced in chemical vapor deposition (CVD) equipment carrying out a polysilicon grain (HSG) process.

FIG. 9 is a graph showing a correlation between the reflective index at the surface of the capacitor storage electrode and the minimum capacitance (Cmin) of the capacitor, during the HSG growing process. In FIG. 9, the reflective index is plotted along the X-axis, and the minimum capacitance (Cmin) is plotted along the Y-axis. The reflective index and the minimum capacitance (Cmin) have an inverse proportional relationship. That is, the minimum capacitance decreases as the reflective index increases. A higher reflective index is indicative of the prevention of the growth of the HSGs, namely of a difficulty in obtaining a higher capacitance. From the results of FIGS. 8 and 9, it can be understood that the size of the HSGs of the capacitor storage electrode decreases as the ozone density increases, thereby decreasing capacitance.

Figure 10:
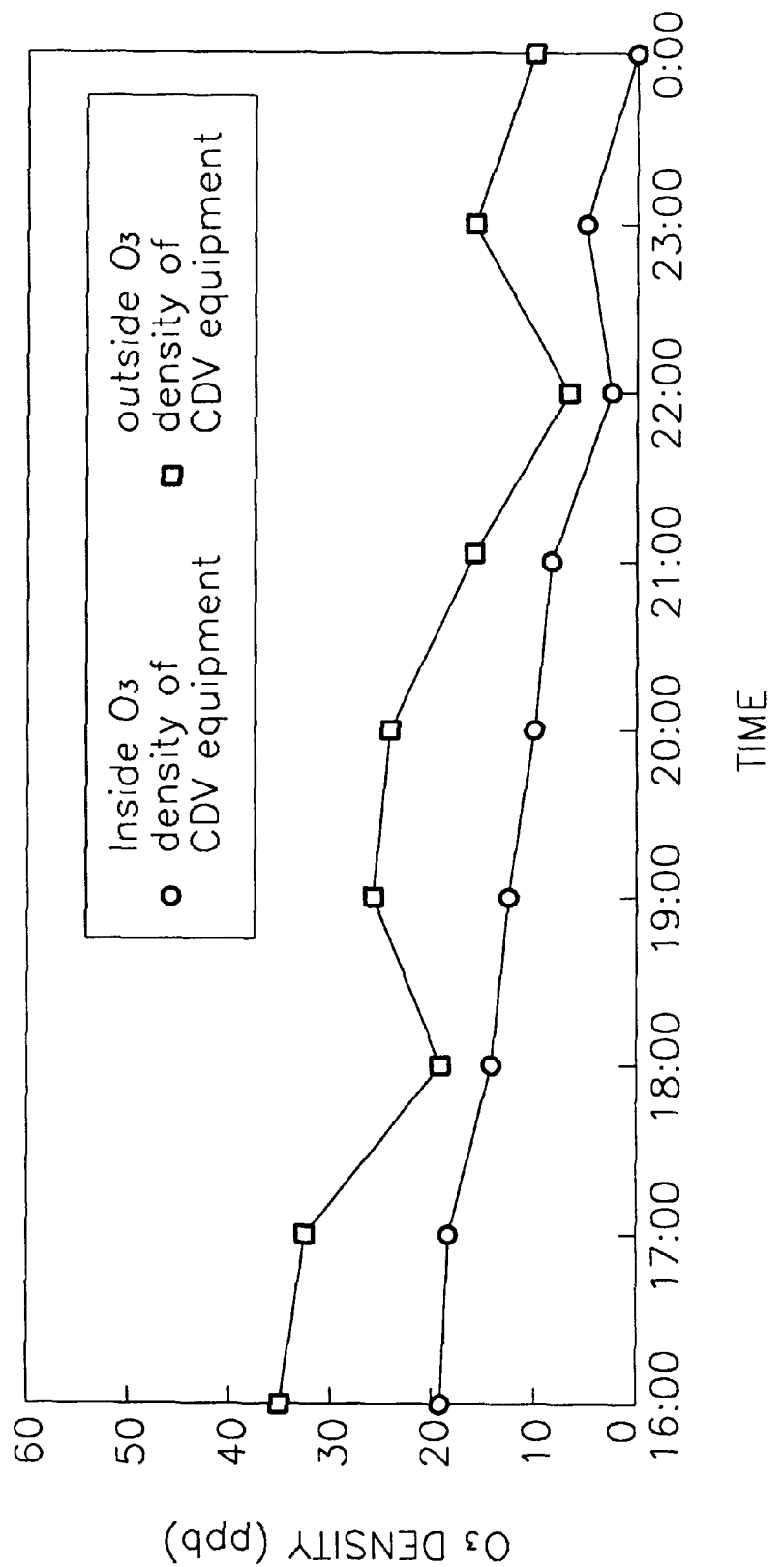
FIG. 10 is a graph showing the results of the removal of ozone from air by practicing the present invention in conjunction with chemical vapor deposition (CVD) equipment carrying out a polysilicon grain (HSG) process.

FIG. 10 is a graph showing the ozone removing capability of the air intake apparatus according to the present invention, one of which is installed at the top and one of which is installed at the side of CVD equipment used for carrying out the HSG process. Here, the plot denoted by circles (-○-○-) represents the ozone density inside the equipment, that is, the ozone density after chemical contaminants such as ozone have been removed by the air intake apparatus. The plot denoted by rectangles (-□-□-) represents the ozone density outside the equipment, that is, the ozone density before the chemical and particulate contaminants are filtered. The times at which the measurements of ozone density were performed are plotted along the X-axis, while the ozone density (ppb) is plotted along the Y-axis.

As can be seen from FIG. 10, by installing the air intake apparatus according to the present invention in the CVD equipment used for carrying out the HSG process, the ozone density inside the equipment is markedly decreased. In terms of percentage, the internal ozone density is decreased by an average of 57.3%. The reduction in the ozone density allows the HSGs to grow larger during the HSG process, thereby yielding a DRAM of a relatively high capacitance.

As described above, the air intake apparatus of a semiconductor fabricating equipment according to the present invention removes chemical contaminants as well as particulate contaminants from the air drawn in from the outside. Accordingly, the quality in terms of performance of the semiconductor devices produced by such equipment is quite high.

Although the present invention has been illustrated and described above with respect to specific embodiments, various modifications and alterations of these embodiments will become apparent to those skilled in the art. Therefore, all such alterations and modifications are seen to be within the true spirit and scope of the invention as defined by the appended claims.

What is claimed is:

1. An air intake apparatus of chemical vapor deposition equipment, comprising:

an air intake means for drawing in air from a location outside of the equipment;

an ozone filter for removing chemical contaminants from the air passing through the air intake means, the ozone filter comprising activated carbon for use in removing ozone ($O_3$) from the air that has passed through the air intake means;

a first filter disposed upstream of the air intake means, for use in removing particulate contaminants;

a second filter disposed downstream of the air intake means, for use in removing particulate contaminants, wherein air intake holes of the first filter are larger than air intake holes of the second filter; and a fan disposed between the ozone filter and the second filter, for use in offsetting a drop in air pressure.

2. The air intake apparatus of claim 1, wherein the air intake means is a fan.

3. The air intake apparatus of claim 1, wherein the ozone filter comprises air intake holes arranged in a body containing activated carbon.

4. The air intake apparatus of claim 1, wherein the second filter is disposed downstream of the ozone filter.

5. The air intake apparatus of claim 1, wherein the second filter is disposed upstream of the ozone filter.

6. A method of removing chemical contaminants, comprising steps of:

drawing in air from outside of chemical vapor deposition equipment using an air intake means, wherein particulate contaminants are removed from the air using a first filter;

filtering chemical contaminants from the drawn in air using an ozone filter which employs a chemical reaction in which activated carbon on a surface of the ozone filter absorbs ozone from the air;

offsetting a drop in air pressure using a fan disposed between the ozone filter and a second filter; and removing particulate contaminants from the air using the second filter, wherein the first filter removes larger particulate contaminants than the second filter.

7. The method of claim 6, wherein during the drawing in step, the air intake means comprises a fan.

8. The method of claim 6, wherein the steps of offsetting the drop in air pressure using a fan and removing particulate contaminants from the air using the second filter take place after the step of filtering chemical contaminants using the ozone filter.

9. The method of claim 6, wherein the steps of removing particulate contaminants from the air using the second filter and offsetting the drop in air pressure using a fan take place before the step of filtering chemical contaminants using the ozone filter.

* * * * *